Jan. 17, 1967   B. S. HANSOM   3,299,415
ELECTRICAL CIRCUITS FOR USE WITH TEMPERATURE RESPONSIVE DEVICES
Filed Oct. 25, 1963
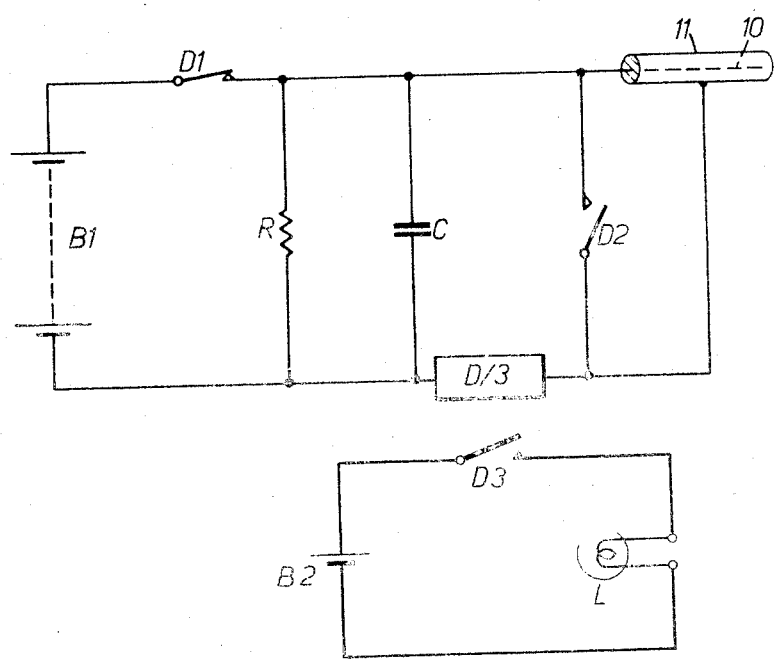
INVENTOR
BERNARD S. HANSOM
BY
Mason, Mason & Albright
ATTORNEYS

United States Patent Office 3,299,415
Patented Jan. 17, 1967

3,299,415
ELECTRICAL CIRCUITS FOR USE WITH TEMPERATURE RESPONSIVE DEVICES
Bernard S. Hansom, Langley, England, assignor of one-half to Graviner Manufacturing Company Limited, Staines, England, and one-half to Wilkinson Sword Limited, London, England, both British companies
Filed Oct. 25, 1963, Ser. No. 318,930
Claims priority, application Great Britain, Nov. 1, 1962, 41,292/62
2 Claims. (Cl. 340—227)

This invention relates to electrical circuits for use with temperature responsive devices.

Electrical circuits in accordance with the invention are particularly adapted for use with temperature responsive devices of the kind which have an electrical resistance which varies with temperature. Examples of such temerature responsive devices are those described in the specifications of United States Patent Specifications Nos. 2,731,532; 2,836,692 and 3,089,339, all of which are assigned to the assignees of the present application. In temperature responsive devices of the kind which are the subject of the first two mentioned patents, the electrical resistance decreases gradually with increasing temperature. In other known devices there is an abrupt change of electrical resistance at a predetermined temperature; this latter method of operation occurs when the temperature responsive device contains a chemical salt whose electrical conductivity changes abruptly at a predetermined temperature. The temperature responsive device described in the specification of the third of the aforementioned patents can operate in both the aforesaid ways.

The present invention provides an electrical circuit specifically designed to enable temperature responsive devices of the foregoing kind to operate satisfactorily with a unidirectional electrical potential.

One example of an electrical circuit in accordance with the invention and which is designed for use with such temperature responsive devices will now be described with reference to the accompanying circuit diagram.

This circuit, which is only one example of many such possible circuits, consists of an electromagnetic relay D/3 connected in series with the inner electrode 10 and outer electrode 11 (provided by the metal sheath) of the temperature responsive device across a source B1 of unidirectional potential. A capacitor C and resistor R are connected in parallel between the inner electrode 10 and the negative terminal of the unidirectional potential source B1. The relay D/3 controls a normally-closed pair of contacts D1, connected in series between the positive terminal of source B1 and the inner electrode 10, and a pair of normally-open contacts D2 connected between the inner electrode 10 and outer electrode 11. Relay D/3 also controls a second pair of normally-open contacts which when closed effect operation of an indicating and/or warning means, hereafter referred to solely as the "indicator." This indicator is represented diagramatically by a warning lamp L which is illuminated from battery B2 when contacts D3 are closed.

The electrical circuit provides a unidirectional potential from source B1 across the electrodes 10, 11 of the temperature responsive device such that when the device is at a predetermined temperature the current passing between the electrodes 10, 11 is sufficient to operate indicator L to show that the device is at or above the predetermined temperature.

When the predetermined current is attained the source B1 is disconnected from across the electrodes 10, 11 for a predetermined time during which the indicator L1 remains in the operative condition. At the expiry of the predetermined time the unidirectional potential is applied once more between the electrodes 10, 11 and if the current which then flows is still at the predetermined level the cycle is repeated, that is to say the unidirectional potential is again disconnected for the predetermined period. On the other hand if the current between the electrodes 10, 11 of the detector device has fallen below that necessary to operate the indicator L1, then the indication and/or warning ceases.

This mode of operation results from the fact that when the predetermined current flows through the device, and hence through the relay D/3, the relay D/3 is operated to close the normally-open contacts D3 thereby operating the indicator L. Operation of the relay D/3 also closes the other normally-open contacts D2 which when closed short circuit the current path through the device. The opening of the normally-closed contacts D1 disconnects the unidirectional supply source B1 from the remainder of the circuit. The capacitor C now discharges through the relay D/3 and through the contacts D2, by-passing the device. The discharge current of capacitor C maintains the relay D/3 operative for a time dependent upon the time-constant (RC) of the discharge circuit. When the capacitor discharge current falls below the value necessary to maintain the relay D/3 operative the circuit reverts to its initial condition. If the temperature of the device has not fallen the relay D/3 will again be operated to restart the cycle, the capacitor C having been recharged by closure of the normally-closed relay contacts D1. The indicator L is arranged to remain operated during the short intermediate periods in which the relay D/3 is de-energized either as a result of making contacts D3 slow to open or simply because the filament of the lamp will not cool down during the short period for which the contacts are open. On the other hand, if the temperature of the device has fallen and the current is insufficient to re-operate the relay D/3 the indication will cease. It will be appreciated that the circuit is arranged so that the period during which the relay D/3 is maintained by the capacitor discharge current is large by comparison with the period during which the current must flow through the device to effect operation of the relay D/3.

Typical values for the circuit components are 24 volts for source B1, one megohm for resistor R and fifty microfarads for capacitor C.

Put in another way, the current corresponding to that which is necessary to effect initial operation of the indicator L1 only flows between the electrodes 10, 11 of the device for a fraction of the time during which the indicator L1 is operative. This is of advantage with certain types of device where the flow of current at the necessary level for an extended period will result in either a permanent or temporary change in the functioning of the device and which will result in misleading operation. Such troubles can frequently be avoided by the use of an alternating potential, but an alternating potential is not always available and the present invention makes possible the use of a unidirectional potential in such circumstances. If the passage of such current through the device will eventually result in permanent damage to the device the circuit described enables the life of the device to be extended in proportion to the ratio of the period during which current flows through the device to the total length of operating time of the indicator.

It will be apparent that many other circuits can be employed to achieve the same object. Thus, for example, in order to provide high sensitivity a silicon controlled rectifier may be used which is triggered by the passage of current through the detector and which is itself used to control operation of the indicator.

I claim:

1. An electrical circuit for use with a temperature responsive device having first and second electrodes, comprising a first unidirectional potential source,
an electromagnetic relay, said relay controlling a first pair of contacts which are normally closed, a second pair of contacts which are normally open and a third pair of contacts which are normally open, the condition of said contacts being changed from their normal condition when said relay is electrically energised, said first potential source being connected in series electrical circuit with said relay and said first pair of contacts between said first and second electrodes, said second pair of contacts being connected between said first and second electrodes,
a capacitor,
a resistor, said resistor being electrically connected in parallel with said capacitor in series electrical circuit with said first potential source and said first pair of contacts,
a second potential source, and
an electrically operated indicator, said indicator being connected in series electrical circuit with said second potential source and said third pair of contacts.

2. An electrical circuit for use with a temperature responsive device having first and second electrodes, comprising a unidirectional potential source,
electrically operated switching means, said switching means having first, second and third circuit closure means, said first circuit closure means being normally closed and said second and third circuit closure means being normally open, the condition of said first, second and third circuit closure means being changed from their normal condition when said switching means is electrically energised, said potential source being connected between said first and second electrodes in series electrical circuit with said switching means and said first circuit closure means, said second circuit closure means being connected between said first and second electrodes, whereby a shunt path is provided between said first and second electrodes when said second circuit closure means is closed,
electrical charge storage means,
resistance means electrically connected in parallel with said charge storage means in series electrical circuit with said potential source and said first circuit closure means,
an electrically operated indicator, and
energising means for said indicator, said indicator being electrically connected to said energising means under the control of said third circuit closure means whereby said indicator is operated when said third circuit closure means is closed.

References Cited by the Examiner
UNITED STATES PATENTS

| | | | |
|---|---|---|---|
| 3,171,019 | 2/1965 | Riddel | 317—132 X |
| 3,197,754 | 7/1965 | Miles | 340—228 X |
| 3,202,883 | 8/1965 | Wells et al. | 317—132 |

NEIL C. READ, *Primary Examiner.*

THOMAS B. HABECKER, *Examiner.*

D. YUSKO, R. M. ANGUS, *Assistant Examiners.*